United States Patent [19]

Chen

[11] Patent Number: 5,211,033
[45] Date of Patent: May 18, 1993

[54] PLATE MECHANISM OF THE PATTERN WHEEL KNITTING MACHINE

[76] Inventor: Chun-Chung Chen, 35-2, Kuang Wu St., Shu-lin, Taipei, Taiwan

[21] Appl. No.: 910,511

[22] Filed: Jul. 8, 1992

[51] Int. Cl.⁵ .................. D04B 15/00; B61F 17/00; F16C 19/10
[52] U.S. Cl. .......................................... 66/8; 66/1 R; 384/126; 384/606
[58] Field of Search ............... 66/8, 1 R; 384/126, 384/469, 606

[56] References Cited

U.S. PATENT DOCUMENTS

| | | | |
|---|---|---|---|
| 1,680,120 | 8/1928 | Shoner | 384/606 |
| 3,144,279 | 8/1964 | Smith | 384/126 |
| 4,000,559 | 1/1977 | Korrenn et al. | 384/126 X |
| 4,286,829 | 9/1981 | Heemskerk | 384/469 |
| 4,861,172 | 8/1989 | Annast et al. | 384/126 X |

Primary Examiner—Clifford D. Crowder
Assistant Examiner—John J. Calvert
Attorney, Agent, or Firm—Morton J. Rosenberg; David I. Klein

[57] ABSTRACT

A plate mechanism of a pattern wheel knitting machine is provided with an improved lubricating system. The lubricating system has a groove formed on the contact surface between the plate and the gear of the machine for receiving balls therein. A flat liner ring is placed between the gear and the plate interior to the groove. The lubricating system is used, as the motor of the knitting machine starts the gear to rotate on the plate, to stabilize the gear, alleviate wear on the contact surfaces, and prolong the life of the knitting machine.

1 Claim, 3 Drawing Sheets

PLATE MECHANISM OF THE PATTERN WHEEL KNITTING MACHINE

FIELD OF THE INVENTION

1. Background of the Invention

The present invention relates to an improved structure of a plate mechanism used in a pattern wheel knitting machine. In particular, the present invention refers to a lubricating system in the mechanism comprising balls and a liner ring used on the contact surface between a gear and the plate mechanism. The lubricating system is designed to ensure stability between the plate and the gear, and to relieve the wearing of the contact surface so as to increase the life of the knitting machine.

2. Prior Art

On a knitting machine, the stitch cylinder is rotated by a gear at a high speed. Therefore, a lubricating system is needed for the contact surface between the plate and the gear to decrease the friction therebetween.

Conventional pattern wheel knitting machines may be provided with a lubricating system as illustrated in FIG. 4. These prior art lubricating systems are still subject to problems, because of the stress concentration on the contact surface of the balls 15. The balls 15 between the plate 11 and gear 12 bear the total weight of the gear 12 and the stitch cylinders, and with the hardness of the balls, the groove formed on the contact surface for receiving the balls will wear out over time. Even if the lubricating system is further provided with steel rings in the groove, the stress still concentrates on the balls which will damage the contact surface, and decrease the effect of the lubricating system.

As the steel rings in the groove of the plate are worn, there will develop excessive play between the gear and the plate which may cause a transverse slide of one with respect to the other. However, to replace the worn balls or the steel rings, it is necessary to lift the heavy gear and the stitch cylinder from the plate, and such operations can be considerably wasteful of time and money.

SUMMARY OF THE INVENTION

To overcome the disadvantage of the foregoing conventional knitting machine, the present invention provides an improved plate mechanism, for use in a pattern wheel knitting machine. The present invention includes a lubricating system formed by balls and a liner ring, provided between the plate and the gear to ensure the stability therebetween, alleviate the wearing of the contact surface, and prolong the life of the knitting machine.

Therefore, it is the main object of the present invention to provide a lubricating system to be used between the plate and the gear in the knitting machine which comprises a number of balls received in a groove formed on the contact surface, and a flat liner ring equipped on the inner side of the groove. Such mechanism is able to prevent the gear from a transverse slide and increase the resistance to wearing.

Detailed description of the present invention is disclosed hereinbelow along with the drawings.

DESCRIPTION OF THE PREFERRED EMBODIMENT

Figure 1:
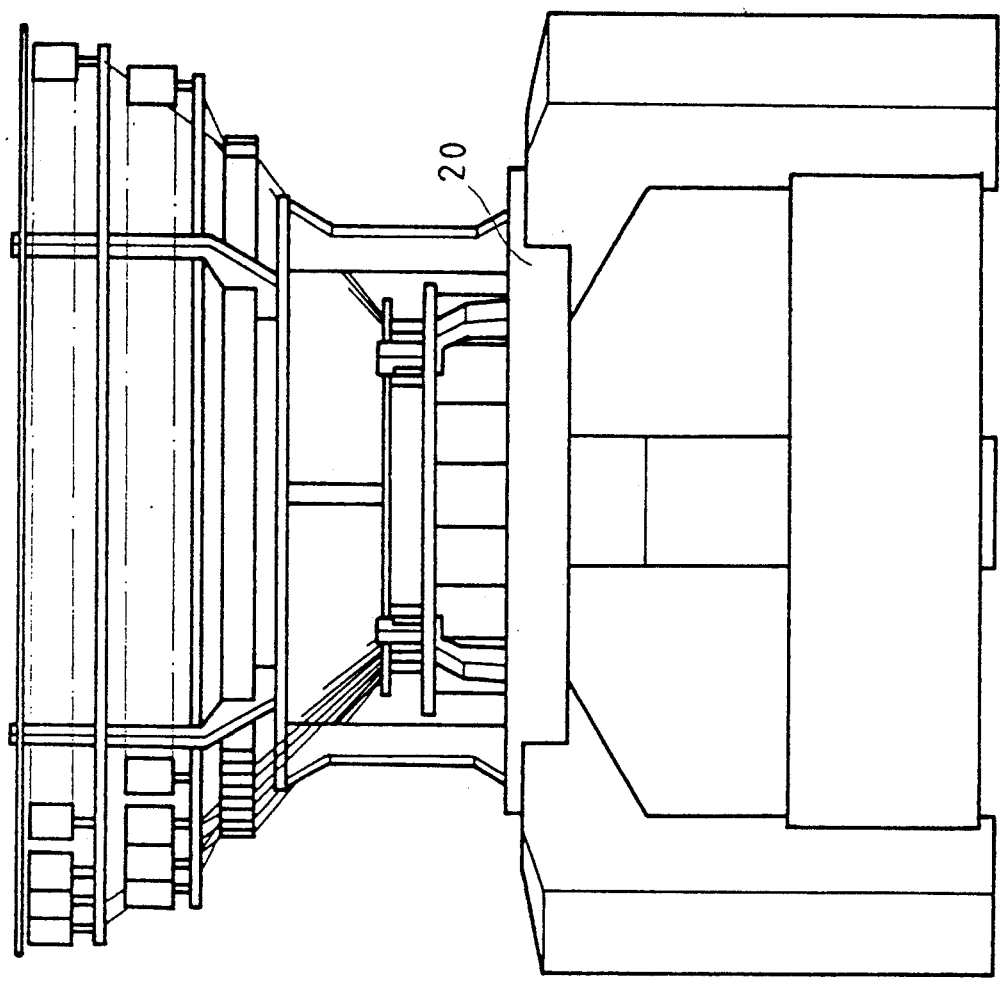
FIG. 1 is a front view showing a pattern wheel knitting machine equipped with the plate mechanism of the present invention.
Figure 2:
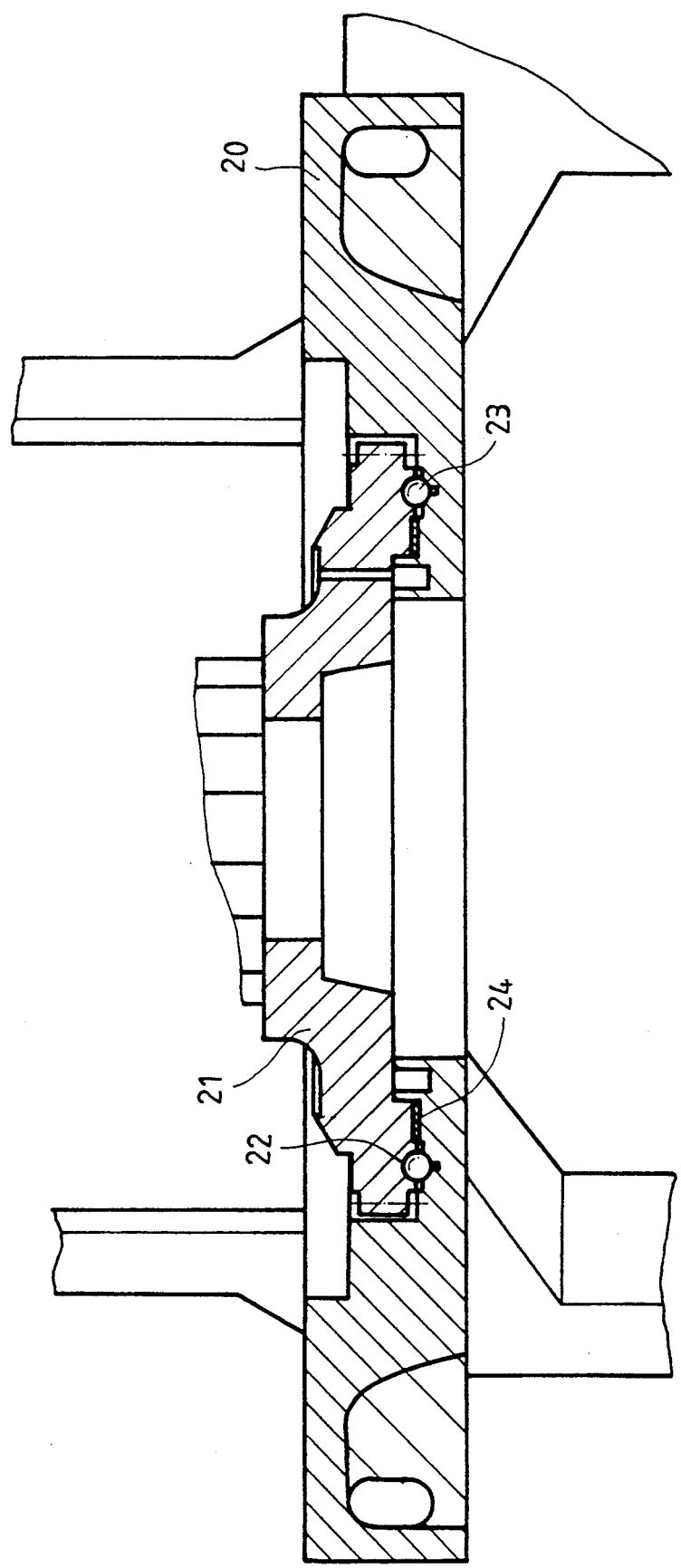
FIG. 2 is a sectional view showing the contact surface between the plate and the gear provided with the lubricating system of the present invention.
Figure 4:
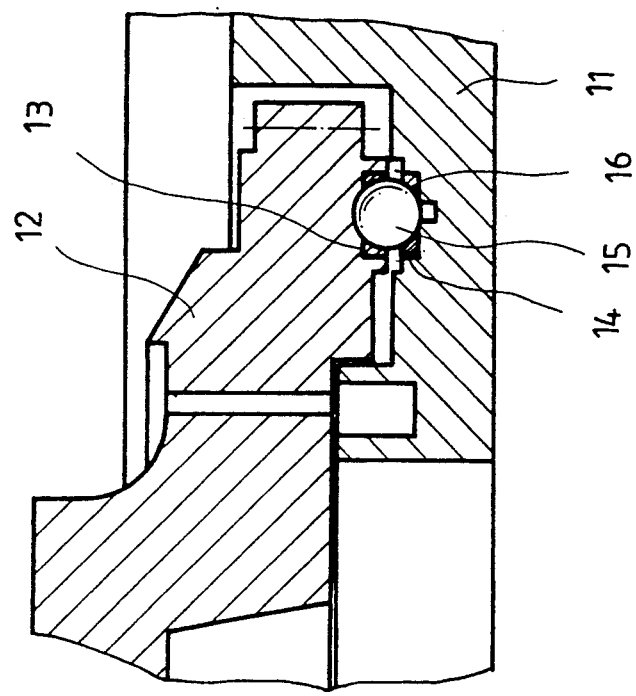
Figure 3:
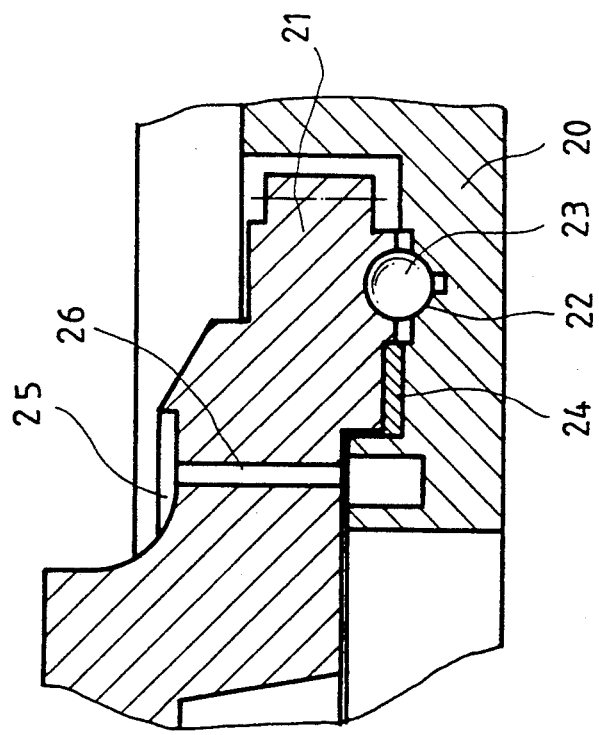
FIG. 3 is a partial sectional view showing the lubricating system of the present invention in detail; and, FIG. 4 is a partial sectional view illustrating a prior art lubricating system in the knitting machine.

The lubricating system in the plate mechanism of the present invention, used in a pattern wheel knitting machine, is illustrated in FIGS. 1, 2 and 3. The lubricating system is defined by a groove 22 formed on the contact surface between the plate 20 and the gear 21 for receiving a number of balls 23 therein, and a flat liner ring 24. The flat liner ring 24 is disposed between the gear 21 and the plate 20 interior to the groove 22.

Referring now to FIG. 3, it is seen that the lubricating oil in the oil groove 25 on the surface of the gear 21 flows to the contact surface between the gear 21 and the plate 20 through an oil inlet 26. The oil directly soaks the liner ring 24, and then flows into the groove 22 to lubricate the balls 23.

Between the plate 20 and the gear 21, the balls 23 and the liner ring 24 bear the load together. However, it is the liner ring 24 that shares most of the load, and relieves the friction between the balls 23 and the groove 22. The hardness of the balls 23 is greater than that of the groove 22, and therefore will not be worn easily, for they serve as auxiliary lubricant only, and bear less of the load. The liner ring 24, which is soaked with oil, performs the desired lubricating function. Furthermore, the flat shape of the liner ring 24, placed on the contact surface, provides a stabilizing function, preventing the gear 21 and the plate 20 from excessive play which results in transverse slide therebetween. As the motor of the knitting machine starts the gear 21 to rotate on the plate 20, the lubricating system makes possible the stability of the gear and the stitch cylinder, and alleviates the wearing of the contact surfaces.

As mentioned above, it is obvious that the improved lubricating system, with a simplified structure formed by a liner ring and balls, for bearing the load, alleviates wear, and increasing the stability thereof, functions better than conventional lubricating systems.

What is claimed is:

1. An improved plate mechanism for a pattern wheel knitting machine having a lower surface of a gear member in juxtaposition with an upper surface of a plate member, comprising:

a plurality of ball members disposed in a circularly shaped recess formed between said gear member and said plate member, said circularly shaped recess being defined by, a first groove formed in said lower surface of said gear member extending circumferentially adjacent a perimeter portion thereof, and a second groove formed in said upper surface of said plate member in displaced vertically aligned relation with said first groove;

a flat liner ring member disposed between said lower surface of said gear member and said upper surface of an interior of said plate member to said circularly shaped recess, said flat liner ring member having an annular contour; and, an oil flow passage formed in said gear member for providing fluid communication between an oil groove formed on an upper surface of said gear member and said circularly shaped recess, said oil flow passage extending between said gear member and the plate member interior to said circularly shaped recess for maintaining said flat liner ring soaked with oil.

* * * * *